US011960273B2

(12) United States Patent
Somarakis et al.

(10) Patent No.: US 11,960,273 B2
(45) Date of Patent: Apr. 16, 2024

(54) METHOD AND ARCHITECTURE FOR AI-ASSISTED SUPERVISION FOR A CONTROLLED SYSTEM

(71) Applicant: Palo Alto Research Center Incorporated, Palo Alto, CA (US)

(72) Inventors: Christoforos Somarakis, Gilroy, CA (US); Erfaun Noorani, Fairless Hills, PA (US); Raman Goyal, Mountain View, CA (US); Aleksandar B. Feldman, Santa Cruz, CA (US); Shantanu Rane, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/879,537

(22) Filed: Aug. 2, 2022

(65) Prior Publication Data

US 2023/0400848 A1 Dec. 14, 2023

Related U.S. Application Data

(60) Provisional application No. 63/350,711, filed on Jun. 9, 2022.

(51) Int. Cl.
*G05B 23/02* (2006.01)
(52) U.S. Cl.
CPC ..... *G05B 23/0289* (2013.01); *G05B 23/0229* (2013.01)
(58) Field of Classification Search
None
See application file for complete search history.

(56) References Cited

U.S. PATENT DOCUMENTS 9,977,430 B2 * 5/2018 Shalev-Shwartz ... G05D 1/0055

OTHER PUBLICATIONS

Pranatyasto, Toto Nugroho, and S. Joe Qin. "Sensor validation and process fault diagnosis for FCC units under MPC feedback." Control Engineering Practice 9.8 (2001): 877-888. (Year: 2001).*
Tjahjadi, Andre, et al. "Robustness analysis of genetic network programming with reinforcement learning." SCIS & ISIS SCIS & ISIS 2010. Japan Society for Fuzzy Theory and Intelligent Informatics, 2010. (Year: 2010).*
Colby, Mitchell K., and Kagan Tumer. "Multiagent reinforcement learning in a distributed sensor network with indirect feedback." AAMAS. 2013. (Year: 2013).*
Stanković, Nikola, et al. "Fault tolerant control design for a class of multi-sensor networked control systems." International Journal of Adaptive Control and Signal Processing 30.2 (2016): 412-426. (Year: 2016).*

(Continued)

*Primary Examiner* — Carlos R Ortiz Rodriguez (57) ABSTRACT

Embodiments described herein provide a supervisor for fault management at a production system. During operation, the supervisor can obtain a set of sensor readings and a state of the production system. A respective sensor reading is an output of a sensor in the production system. The supervisor can then determine, using an artificial intelligence (AI) model, whether the set of sensor readings accommodates a fault associated with a corresponding sensor. Subsequently, the supervisor can determine an action that mitigates an effect of the fault and modify the set of sensor readings based on the action. Here, the modified set of sensor readings is used by a controller that controls the production system.

20 Claims, 8 Drawing Sheets

(56) References Cited

OTHER PUBLICATIONS

Shekar, Arvind Kumar, et al. "Building robust prediction models for defective sensor data using Artificial Neural Networks." arXiv preprint arXiv:1804.05544 (2018). (Year: 2018).*

Kumar, D. Praveen, Tarachand Amgoth, and Chandra Sekhara Rao Annavarapu. "Machine learning algorithms for wireless sensor networks: A survey." Information Fusion 49 (2019): 1-25. (Year: 2019).*

Gaddam, Anuroop, et al. "Detecting sensor faults, anomalies and outliers in the internet of things: A survey on the challenges and solutions." Electronics 9.3 (2020): 511. (Year: 2020).*

\* cited by examiner

METHOD AND ARCHITECTURE FOR AI-ASSISTED SUPERVISION FOR A CONTROLLED SYSTEM

RELATED APPLICATION

This application claims the benefit of U.S. Provisional Application No. 63/350,711, titled "Design Architecture for AI-Assisted Design for a Controlled System," by inventors Christoforos Somarakis, Erfaun Noorani, Raman Goyal, Aleksandar B. Feldman, and Shantanu Rane, filed 9 Jun. 2022, the disclosure of which is incorporated by reference herein.

FIELD

Background

This disclosure is generally related to the field of artificial intelligence (AI). More specifically, this disclosure is related to a system and method for facilitating an AI-based supervisor for a controlled system.

Related Art

A cyber-physical system can be a computer system in the operations can be controlled or monitored by a computing device, such as a hardware- or software-based controller. The controller can operate based on one or more algorithms that can control the cyber-physical system. A cyber-physical system can suffer anomalies (e.g., faults or malicious attacks) that can lead to disruption to the operations. Hence, quick and efficient methods of detection and isolation of the anomalies are necessary for operating the cyber-physical system.

The exponential growth of AI-based techniques, such as learning mechanisms, has made them a popular medium for monitoring complex systems. Reinforcement Learning (RL) models have become a popular mechanism for learning the parameter space associated with a controlled system. To do so, an RL model can be trained based on rewarding target behaviors and punishing unwanted behaviors. As a result, an RL agent can determine the environment represented by the parameter space and learn through iterations.

SUMMARY

Embodiments described herein provide a supervisor for fault management at a production system. During operation, the supervisor can obtain a set of sensor readings and a state of the production system. A respective sensor reading is an output of a sensor in the production system. The supervisor can then determine, using an artificial intelligence (AI) model, whether the set of sensor readings accommodates a fault associated with a corresponding sensor. Subsequently, the supervisor can determine an action that mitigates an effect of the fault and modify the set of sensor readings based on the action. Here, the modified set of sensor readings is used by a controller that controls the production system.

In a variation on this embodiment, the supervisor can identify the sensor associated with the fault. The supervisor can then modify the set of sensor readings by modifying a sensor reading of the identified sensor.

In a variation on this embodiment, the supervisor can determine the action by determining a reference signal for the production system and determining the action such that the controller maintains the target behavior of the production system. The reference signal can indicate a target behavior of the production system.

In a further variation, the state can include an adjusted state generated by the controller for maintaining the target behavior of the production system. The adjusted state can then be generated based on a previously modified set of sensor readings.

In a variation on this embodiment, the production system can include a plurality of sensors measuring a same element. The supervisor can combine respective sensor readings from the plurality of sensors based on a fusion scheme.

In a variation on this embodiment, the AI model can include a Reinforcement Learning (RL) agent trained based on system dynamics of the production system.

In a variation on this embodiment, the AI model can be trained to learn a policy that includes detecting the fault at a time of occurrence and incorporating the action mitigating the fault.

In a further variation, the policy can also include one or more of: determining a magnitude of the fault and identifying a sensor associated with the fault.

In a variation on this embodiment, the fault can include one or more of: a time-varying fault and a dynamic fault. The time-varying fault can appear and disappear during operation of the production system. On the other hand, the dynamic fault can change during operation of the production system.

In a variation on this embodiment, the action can include adding respective mitigating values to the set of sensor readings to mitigate the effect of the fault.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of efficiently supervising a controlled system for protecting from anomalies (e.g., faults or attacks) by augmenting the controlled system with a supervisor that can monitor sensor signals, detect and localize unknown sensor faults, and perform a mitigating action. The controlled system augmented by the supervisor can be referred to as a supervised controlled system and is based on a bi-level control design architecture that supports the isolation of the faulty sensors and mitigation of the effects of the fault in an online fashion.

With existing technologies, model-based diagnostics may require intrinsic prior knowledge of model dynamics. For example, Fault Tolerant Control (FTC) methods rely on prior knowledge of the abnormalities and their effects on the system, such as known system dynamics and faults. The performance of such model-based approaches can be limited by model inaccuracies. Such approaches can also be sensitive to model misspecification. The traditional design is typically composed of a fault detection module that may detect a fault and select a low-level controller specific to the fault from a set of predefined fault controllers. Since the fault is detected and mitigated sequentially, such as approach can delay the response, which might de-stabilize the system.

Such limitation can be mitigated using Blended Control (BC), which can use a hierarchical design with a weighted combination of low-level controllers. The weights with which the controllers get combined constitute a blending weight vector, which is set by a high-level control module. A deep-learning BC design can use an algorithm to set the blending weights to provide a data-driven approach to BC. Such an approach may eliminate the need for prior knowledge of the system dynamics. In such architecture, the high-level control effectively implements the low-level controller and does not directly interact with the controlled system. However, BC designs may synthesize a fault-tolerant controller that can be intrusive and may not facilitate fault localization.

To solve this problem, embodiments described herein provide a supervisor for the controlled system. The supervisor can be a supervisory Reinforcement Learning (RL) agent that can be augmented with the controlled system. The augmented system can be referred to as a supervised controlled system. The supervisor, facilitated by the RL agent, can monitor sensor signals from the controlled system, detect and localize the sensor faults, and perform corresponding mitigating actions. In this way, the supervisor can enable the diagnosis of arbitrary constant sensor faults. For example, the controlled system can be a linearized version of a chemical process with multiple sensors, controlled by a Linear Quadratic Gaussian (LQG) Servo-Controller with Integral Action. The supervisor augmented to this system can isolate the faulty sensors and mitigate the effects of the fault in an online fashion.

The supervised controlled system can converge towards cooperative synergy between the supervisor and the controlled system while mitigating and localizing unknown, constant sensor faults. In this example, an over-observed linear time-invariant controlled plant can support a chemical process. The plant can be prone to actuator and sensor noises. A low-level plant controller can regulate the system output based on a reference signal by minimizing a plant-relevant quadratic cost function. The output can be prone to multiple unknown faults that effectively perturb the system state towards potentially undesirable domains.

An RL agent can be trained to learn aspects of system dynamics, detect the onset of faults, approximate their magnitude, and perform a mitigating action to manage the faults without affecting the performance of the plant. Even though the examples described herein are based on linearized chemical processes, such an RL agent can also be used for security, fault detection, and fault mitigation for general uncertainty or nonlinear systems, such as unmanned aerial vehicles (UAVs) (e.g., drones), temperature control in buildings, general supervisory control and data acquisition (SCADA) and industrial systems, and power grids, etc.

The supervisor, which can be an RL agent, can supervise the outputs of the sensors of a controlled system (e.g., a plant). The supervisor can monitor and protect the control system from undesirable effects of faults or attacks. The supervised controlled system, because of its high-level architecture, can provide robust to inherent system nonlinearities, plant parametric uncertainties, the presence of various several sources of noise, time delays, etc. The core advantage of the supervisor is the combination of model-based and data-driven techniques. Initially, the model-based techniques can be used to develop a supervisor that can be used to navigate agents towards desired policies for the controlled system. Subsequently, the supervisor can be trained to converge by data-driven training to the desired policies. The training process can be agnostic to the system dynamics of the controlled system. Such an approach reduces intervention on the controlled system while being easily generalizable and scalable.

Exemplary Supervised Controlled System

Figure 1:
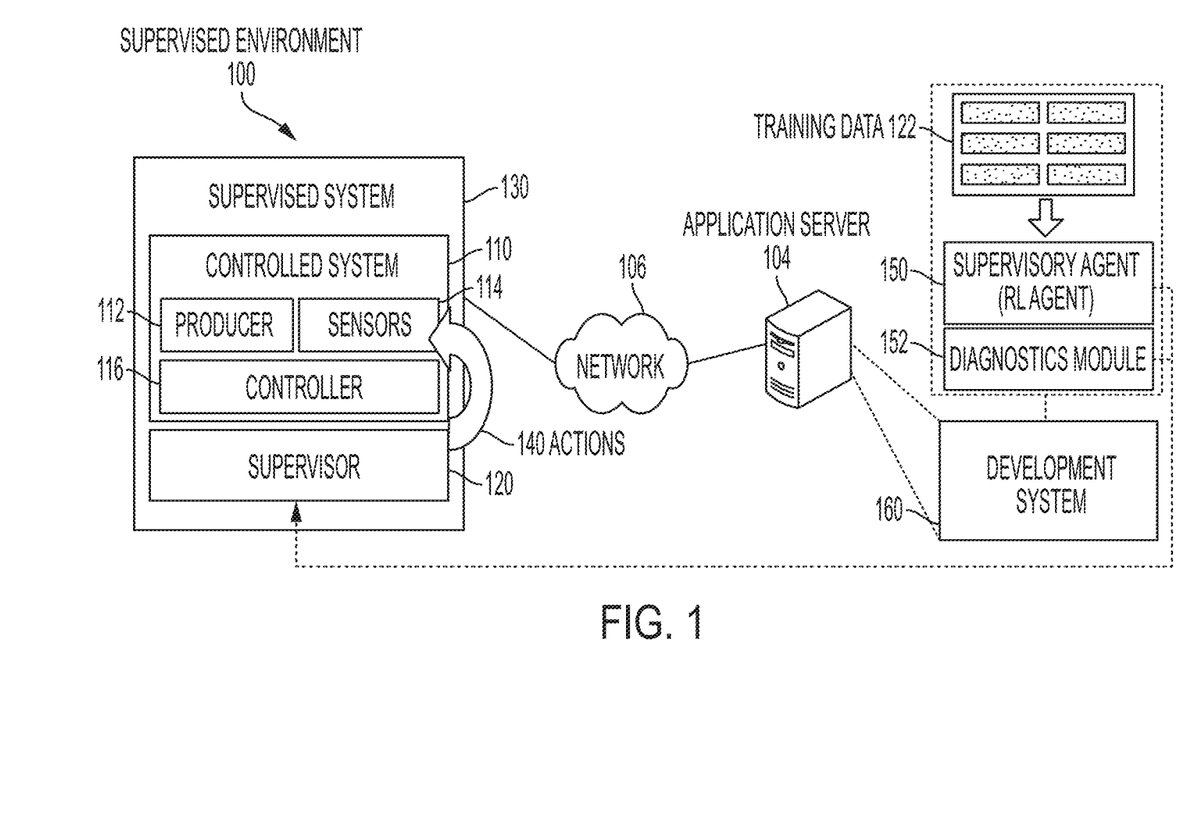
FIG. 1 illustrates an exemplary supervised environment that supports an AI-assisted supervised controlled system, in accordance with an embodiment of the present application.

FIG. 1 illustrates an exemplary supervised environment that supports an AI-assisted supervised controlled system, in accordance with an embodiment of the present application. In this example, a supervised environment 100 can include a controlled system 110 that can include a producer module 112 that can operate as a plant (e.g., for producing an object) based on the outputs of a set of sensors 114. A controller 116 can manage and control producer module 112 to generate an output based on a reference signal. In some embodiments, controller 116 can be a closed-loop low-level controller, such as proportional-integral-derivative (PID), model predictive control (MPC), and Linear Quadratic Gaussian (LQG) controller. Controller 116 can also be based on a trained AI model (e.g., a trained RL agent).

With existing technologies, model-based diagnostics for system 110 may require intrinsic prior knowledge of the dynamics of system 110. For example, FTC methods may rely on prior knowledge of the abnormalities associated with system 110 and their effects on system 110. The performance of such model-based approaches can be limited by the inaccuracies of the models. Such approaches can also be sensitive to misspecification for system 110. The traditional design can include incorporating a fault detection module into system 110 that may detect a fault and select a low-level controller specific to the fault from a set of predefined fault controllers in system 110. Since the fault is detected and mitigated sequentially, such as approach can delay the response, which might de-stabilize system 110.

Such limitation can be mitigated using BC-based hierarchical design with a weighted combination of low-level controllers for system 110. The weights with which the controllers get combined constitute a blending weight vector, which is set by a high-level control module. A deep-learning BC design can use an algorithm to set the blending weights to provide a data-driven approach to BC. Such an approach may eliminate the need for prior knowledge of the dynamics of system 110. In such architecture, the high-level control effectively implements the low-level controller and does not directly interact with system 110. However, BC designs may synthesize a fault-tolerant controller that can be intrusive for system 110 and may not facilitate fault localization in sensors 114.

To solve this problem, a supervisor 120 can be deployed system 110. The supervisor can be a supervisory Reinforcement Learning (RL) agent that can be augmented with system 110. The augmented system can be referred to as supervised controlled system 130 (or supervised system 130). Supervisor 120, which can include an RL agent, can monitor sensor signals from system 110, detect and localize the faults associated with sensors 114, and perform corresponding mitigating actions 140. In some embodiments, mitigating actions 140 can include adding corresponding mitigating values to the respective readings of sensors 114. The mitigating values mitigate the faulty reading from a sensor associated with a fault. For example, if the correct reading of a sensor is A and a faulty reading is (A+B), the mitigating value can be (−B). As a result, upon application of action 140, the sensor reading can become A.

In this way, supervisor 120 augmented to this system 110 can enable the diagnosis of arbitrary constant faults associated with sensors 114, isolate the faulty sensor(s) in sensors 114, and mitigate the effects of the fault in an online fashion based on actions 140. Since the mitigating values can be added in such a way that the faulty readings are mitigated, controller 116 can remain agnostic to the faults. Hence, supervised system 130, because of its high-level architecture, can provide robust to inherent system nonlinearities, plant parametric uncertainties, the presence of various several sources of noise, time delays, etc.

For example, system 110 can be a linearized version of a chemical process plant (i.e., producer 112) with multiple sensors (i.e., sensors 114), controlled by a LQG Servo-Controller (i.e., controller 116) with Integral Action. In other words, system 110 can be an over-observed linear time-invariant controlled plant supporting a chemical process. Producer 112 can be prone to actuator and sensor noises. Low-level plant controller 116 can regulate the output of system 110 based on a reference signal by minimizing a plant-relevant quadratic cost function. The output can be prone to multiple unknown faults that effectively perturb the states of system 110 towards potentially undesirable domains.

Supervised system 130 can converge towards cooperative synergy between supervisor 120 and system 110 while mitigating and localizing unknown, constant faults associated with sensors 114. A development system 160 can train an RL agent 150 to learn aspects of system dynamics associated with system 110, detect the onset of faults, approximate their magnitude, and perform a mitigating action to manage the faults without affecting the performance of system 110. Development system 160 can run on an application server 104 reachable via a network 106. Here, network 106 can be a local or wide area network, such as a virtual local area network (VLAN) or the Internet, respectively. Even though the examples described herein are based on linearized chemical processes, RL agent 150 can also be used for security, fault detection, and fault mitigation for general uncertainty or nonlinear systems, such as UAVs, temperature control, SCADA and industrial systems, and power grids, etc.

The core advantage of RL agent 150 is the combination of model-based and data-driven techniques. Initially, development system 160 can use the model-based techniques to develop RL agent 150 that can be used to navigate agents towards desired policies for system 110. Subsequently, development system 160 can train RL agent 150 to converge by data-driven training to the desired policies. For example, RL agent 150 can be trained based on training data 122 on an application server 104. Training data 122 can include operating information associated with system 110. For example, training data 122 can include data with estimation of physical states of system 110 obtained based on observation or through dynamic filters (e.g., a Kalman or Particle filter). The training process can be agnostic to the system dynamics of system 110. Such an approach reduces intervention on system 110 while being easily generalizable and scalable.

Development system 160 can also determine a diagnostic module 152 for supervisor 120. Diagnostic module 152 can sense information from controlled system 110 in an online fashion, and fuse and supply a supervisory agent 150 (e.g., RL agent 150) of supervisor 120 with corresponding data to supervisory agent 150 to take actions 140 that can mitigate sensor faults. In some embodiments, actions 140 can include sending a time-delayed signals and/or asynchronous response from agent 150 due to communication constraints. Development system 160 can identify the underlying system dynamics of system 110 and low-level controller 116. Development system 160 can then identify sensors 114 and sensor fusion schemes that combine data from multiple sensors.

Development system 160 can determine a feature extraction module (i.e., the module that obtains information from system 110). For example, the extraction module can be diagnostic module 152 determining fault information from sensors 114. Development system 160 can determine the action space, observation space, an objective (e.g., the reward function), and an AI-based algorithm (e.g., an optimization scheme) and associated hyper-parameters. Development system 160 can then train supervisory agent 150 accordingly. Subsequently, development system 160 can deploy supervisory agent 150 and diagnostic module 152 for underlying system 110 (via network 106).

Here, supervisor 120 can facilitate a method for fault detection and mitigation in controlled system 110. To do so, development system 160 can generate supervisory agent 150 with an observation space and an action space based on the configuration of system 110 and expected location of possible faults (e.g., sensors 114). Development system 160 can synthesize reward functions based on lower-level system information, expected location of possible faults, and sensor fusion architecture. Subsequently, development system 160 can use formal methods to choose reward function parameters so that the optimal policy learnt by agent 150 includes the detection of injected faults drawn from known distribution interval at the time of their occurrence.

Moreover, development system 160 can use formal methods to choose reward function parameters so that the optimal policy learnt by agent 150 includes approximating the magnitude of injected faults drawn from known distribution interval at the time of their occurrence. In addition to the approximation, development system 160 can use formal methods to choose reward function parameters so that the optimal policy learnt by agent 150 includes mitigation of injected faults drawn from known distribution interval. Development system 160 can also use formal methods to choose reward function parameters so that the optimal policy learnt by agent 150 includes localizing the exact location of a respective injected fault drawn from known distribution interval.

The developed agent 150 can be trained using training data 122, which can include data with estimation of physical states of system 110 obtained based on observation or through dynamic filters (e.g., a Kalman or Particle filter). Based on the training based on the reward function, diagnostics module 152 can diagnose dynamic and/or time-varying faults that appear and disappear during the operation of system 110. Similarly, supervisor 120 can also diagnose faults that may change with time during the operation of system 110. Here, producer 112's system dynamics and controller 116 can be nonlinear. Upon detecting the faults, agent 150 can perform actions 140, which can include time-delayed signals and/or asynchronous response from agent 150 due to communication constraints.

System Architecture

Figure 2A:
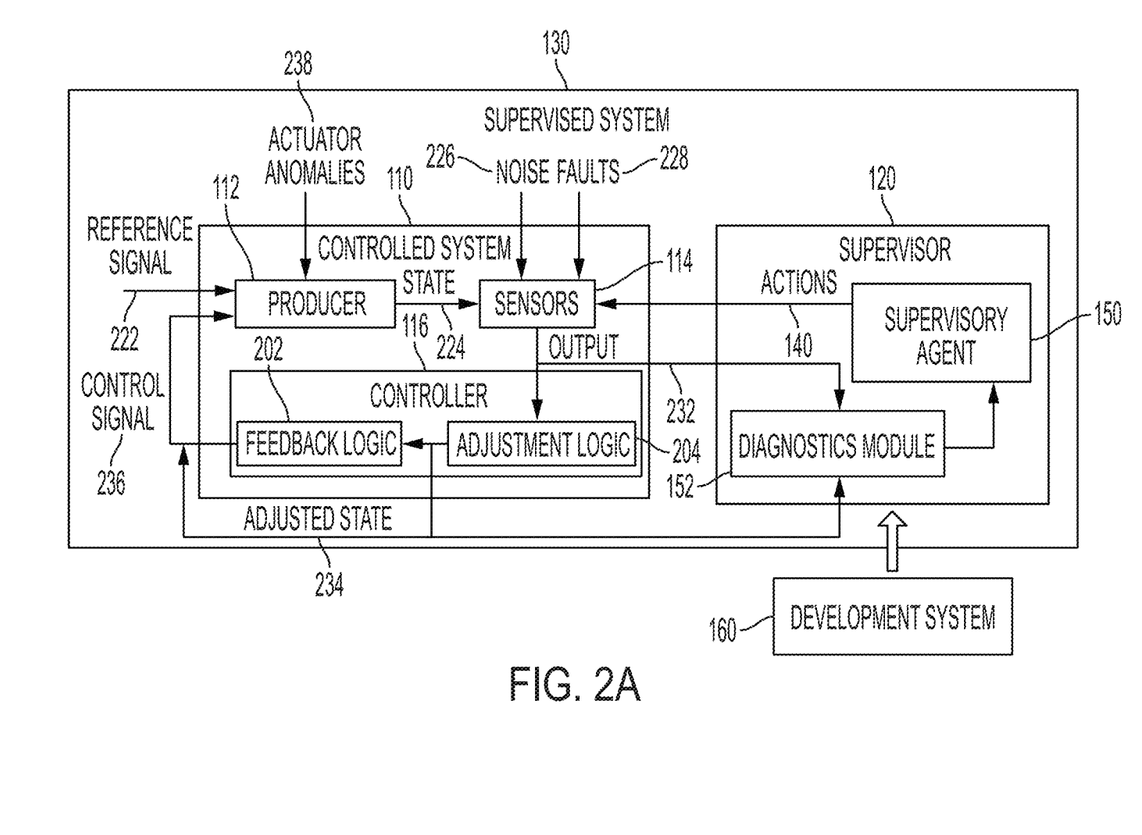
FIG. 2A illustrates an exemplary supervised controlled system, in accordance with an embodiment of the present application.

FIG. 2A illustrates an exemplary supervised controlled system, in accordance with an embodiment of the present application. In this example, system 110 is designed to have output 232 (denoted as y) based on reference signal 222 (denoted as r). Producer 112's state 224 (denoted as x) can be used by sensors 114 to generate output 232. Here, producer 112 can be exposed to actuator anomalies 238 (denoted as η), which indicate the errors or faults associated with the operating mechanism of producer 112. For example, the error can be due to a physical distortion (or imperfection) present in an element (e.g., an actuator) of producer 112. Producer 112 can also be impacted by noise 226 produced by sensors 114 (denoted as 77). Here, a respective sensor may include fundamental inaccuracy due to noise sources (e.g, Gaussian noise).

During operation, sensors 114 can incur unknown faults 228 (denoted as f). Here, sensors 114 can be vulnerable to additive faults, which can be indicated by constant, but uncertain, bias. Controller 116 may not recognize the source of faults 228. As a result, controller 116 may regulate system 110 in such a way that state 224 may not correspond to the desired state. In particular, adjustment logic 204 of controller 116 may determine adjusted state 234 (denoted as x̂) for producer 112 from state 224 to obtain based on output 232 that incorporates faults 228. As a result, feedback logic 202 of controller 116 can send a control signal 236 to producer 112 change one or more operations (e.g., a production rate) of producer 112. The changed operations of producer 112 can then change the current state of producer 112 changes to adjusted state 234. Since adjusted state 234 corresponds to faults 228, the changed operations of producer 112 can diverge from reference signal 222.

Supervisor 120 can include diagnostic module 152 that can sense information from controlled system 110 in an online fashion. Subsequently, diagnostic module 152 can provide a supervisory agent 150 corresponding data to enable agent 150 to take actions 140 that can mitigate faults 228. To determine supervisor 120, development system 160 can explore the underlying system dynamics of system 110. If system 110 is linear, the state of system 110 at time t+1 can be $x_{t+1}=Ax_t+Bu_t+\Gamma\xi_t$, where x is state 224 of system 110, u is low-level control signal 236, and ξ indicates actuator anomalies 238 (e.g., noise) with known statistics. Furthermore, $\Gamma \in \mathbb{R}^{n_x \times n_\xi}$ can be the diffusion matrix associated with the noise source for producer 112.

State x can be observed by sensors 114. Sensors 114 can include sensors deployed in SCADA and other industrial systems. Sensors 114 can consist of an ensemble of independent sensors that monitor state x with corresponding uncertainties. The number of sensors in sensors 114 can be s. Accordingly, each sensor measurement can also be prone to possible fault injection. Linear filtering of state for all sensors can imply:

$$y_t^{(k)}=C_k x_t+N_k \eta_t^{(k)}+\phi_t^{(k)}, k=1,\ldots,s.$$

Here, a respective sensor in sensors 114 can sense state x based on $C_k x$ along with additive sensor noise ri and potential fault ϕ.

Development system 160 can also determine a sensor fusion scheme for sensors 114. A mapping $h_t(\cdot)$ can indicate with which measurements from all sensors are combined to yield aggregate output signal:

$$y_t=h_t(y_t^{(1)},\ldots,y_t^{(s)}).$$

This signal is typically provided to controller 116 for further analysis and control of producer 112. In some embodiments, $h_t(\cdot)$ can be the average of all measurements, which can be:

$$y_t = \frac{1}{s}\sum_{k=1}^{s}\left[C_k x_t + N_k \eta_t^{(k)} + \phi_t^{(k)}\right].$$

Controller 116 can use sensor fusion output, $y_t$, and implement an output-feedback control strategy $u_t=K_t(y_t)$ for a particular purpose. The purpose in this example can be the aggregation of output $y_t$ to track reference signal $r_t$ with respect to corresponding mean value.

In supervised system 130, agent 150 can perceive the state and sensor measurements of system 110 through diagnostic module 152 that processes flow of the input data and contributes to the observation space of agent 150. Agent 150 can then perform actions 140 on system 110 through an embedded compartment (i.e., an action space). Here, the action space corresponds to the optimization of a cost function to achieve given security objectives. At the beginning of each learning episode, agent 150 can start in an initial agent state. At each time-step, agent 150 can receive an observation (e.g., from diagnostic module 152) and execute actions 140 (e.g., by adding an adjustment value to the sensor measurement) according to a policy and a mapping from the observation to an action. In some embodiments, agent 150's actions 140 can also be based on a smooth parametrized function, such as a Neural Network.

Upon the execution of actions 140, system 110 transitions to a successor state. Accordingly, agent 150 can receive an instantaneous cost $c_t$. If agent 150 is an RL agent, the desired cost measure of system 110 can be an expectation of a log-run objective. An example of such an objective can be the expected cumulative cost $J:=E[\Sigma_{t=0}^T c_t]$ over an episode. This expectation can dictate the policy's trajectory distribution. Once agent 150 is trained, agent 150 can be deployed to run simultaneously in parallel with system 110 in supervised system 130.

In this example, system 110 can use three types of input signals from system 110 at each time-step (i.e., for each t) as the set of observations agent 150. Accordingly, the observation space of agent 150 can include control signal $u_t$ (e.g., signal 236), the adjusted state x̂ (e.g., a state estimate from adjustment logic 204), and sensor residuals defined as $y_t^{(k)} - C_k \hat{x}_t$. Subsequently, agent 150 can apply actions 140 on controller 116 through additive intervention on sensors 114

(i.e., by adding respective mitigating values to the readings of sensors 114). The integration of agent 150 into the system dynamics of system 110 can be expressed as:

$$y_t = C_k x_t + \eta_t^{(k)} + \phi_t^{(k)} + a_t^{(k)}, k=1, \ldots, s.$$

In other words, agent 150, by design, intervenes in sensors 114 with actions 140. In some embodiments, sensors 114 can include a set of sensors. Actions 140 can then include a set of actions for the corresponding set of sensors. Beyond the intervention to sensors 114, agent 150 may operate without information regarding the location and magnitude of the fault. Here, the objective of agent 150 can include applying action 140 at each time-step (i.e., at each t) that mitigates the injection of faults into system 110.

Development system 160 can use a Deep Deterministic Policy Gradient (DDPG) based RL algorithm that can be applied to continuous action-spaces and yield a deterministic policy. Accordingly, the architecture of supervised system 130 can facilitate the mitigation of faults 228 without extensively searching the parameter space or possible hyper-parameters. Here, the cost function for the RL algorithm is developed for online security. Given the low-level system dynamics of system 110, sensors 114, and corresponding diagnostic tasks, agent 150 can be determined on the design principles J that can achieve a cooperation between the control hierarchies (i.e., between controller 116 and supervisor 120). By taking the tracking faults 228 at each time-step as the instantaneous cost, agent 150 can try to learn a mapping from the observations to actions, a policy, that minimizes J for particular forms of instantaneous costs $c_t$.

The initial instantaneous costs for training agent 150 can be indicated by $c_t = \|Cx_t - r_t\|^2$, where $$C = \frac{1}{s} \Sigma_k C_k$$

is me cumulative output matrix from the sensor fusion scheme. Since faults 228 may also be caused by attacks on system 110, $c_t$ can facilitate a cybersecurity objective of deploying an RL policy that learns to secure producer 112 from uncertain, constant injected attacks. Hence, the policy that minimizes long term cost J for such choice of $c_t$ can be translated into agent 150's actions 140 that negates cumulatively the effect of all faults present in system 110. In particular, the policy can be present in the following set:

$$M = \{\alpha \in \mathbb{R}^{sn_y}: \Sigma_k a^{(k)} = -\Sigma_k \phi^{(k)}\},$$

where s is the number of sensor and $n_y$ is the dimension of sensor signals. Here, M can be a mitigation space wherein agent 150 can mitigate faults 228 but may not characterize the origin (i.e., detect sensor is faulty).

In addition to mitigation of faults 228 in system 110, supervisor 120 may also determine the origin of faults 228. To associate a respective fault to a corresponding sensor, development system 160 can train agent 150 to minimize:

$$c_t = \|Cx_t - r_t\|^2 + \sum_{k=1}^{s} \|F_k y_t^{(k)} - G_k y_t\|^2$$

for design matrices $F_k$ and $G_k$ that satisfy conditions associated with the architecture of sensors. Here, matrices $F_k$ and $G_k$ can be found that satisfy $F_k C_k = G_k C$, $\forall k=1, \ldots, s$. If matrices $F_k$ and $G_k$ and system dynamics of system 110 satisfy positive definiteness properties, the policy that agent 150 is set to navigate can be present in the following space:

$$ML\mathcal{L} = \{\alpha \in \mathbb{R}^{sn_y}: a^{(k)} = -\phi^{(k)}\}.$$

This implies that agent 150 can learn the fault associated with a respective sensor, approximate the magnitude of the fault, and mitigate the fault.

Figure 2B:
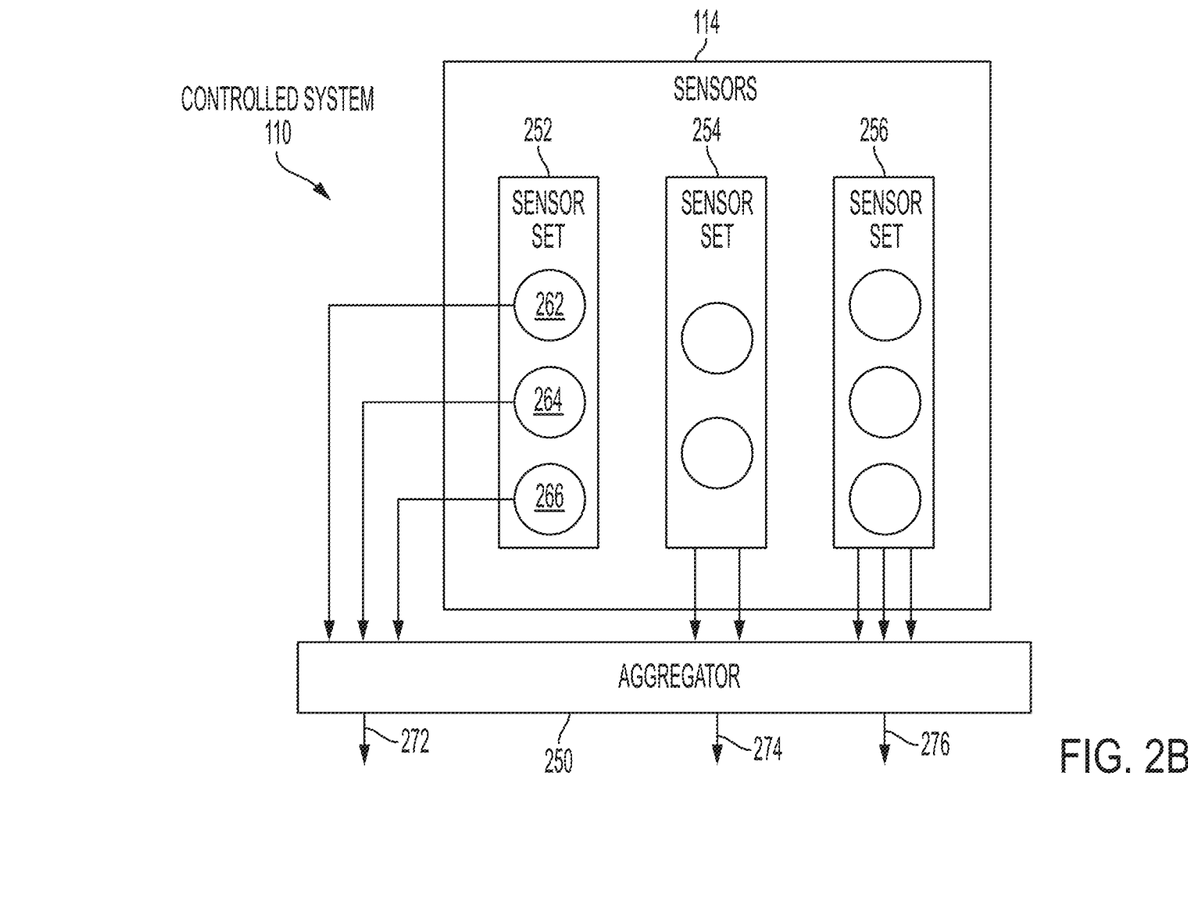
FIG. 2B illustrates an exemplary sensor fusion scheme for a supervised controlled system, in accordance with an embodiment of the present application.

In some embodiments, system 110 can be over-observed where sensors 114 can include a plurality of sensors (e.g., s>1) that observe system 110's state independent of each other. FIG. 2B illustrates an exemplary sensor fusion scheme for a supervised controlled system, in accordance with an embodiment of the present application. Sensors 114 can include a plurality of sensor sets 252, 254, and 256. A respective sensor set can facilitate a particular measurement (i.e., measures the same element). For example, one sensor set can measure temperature while another sensor set can measure pressure. An aggregator 250 can aggregate the measurements for a respective sensor set based on a sensor fusion scheme.

The fusion scheme can be based on one or more of: average, weighted average, and weighted sum. In this example, sensor set 252 can include sensors 262, 264, and 266. Aggregator 250 can determine aggregated or fused sensor value 272 by applying the sensor fusion scheme on the sensor values (or readings) of sensors 262, 264, and 266. In the same ways, aggregator 250 can determine aggregated sensor values 274 and 276 by aggregating respective values of sensor sets 254 and 256, respectively.

Figure 3:
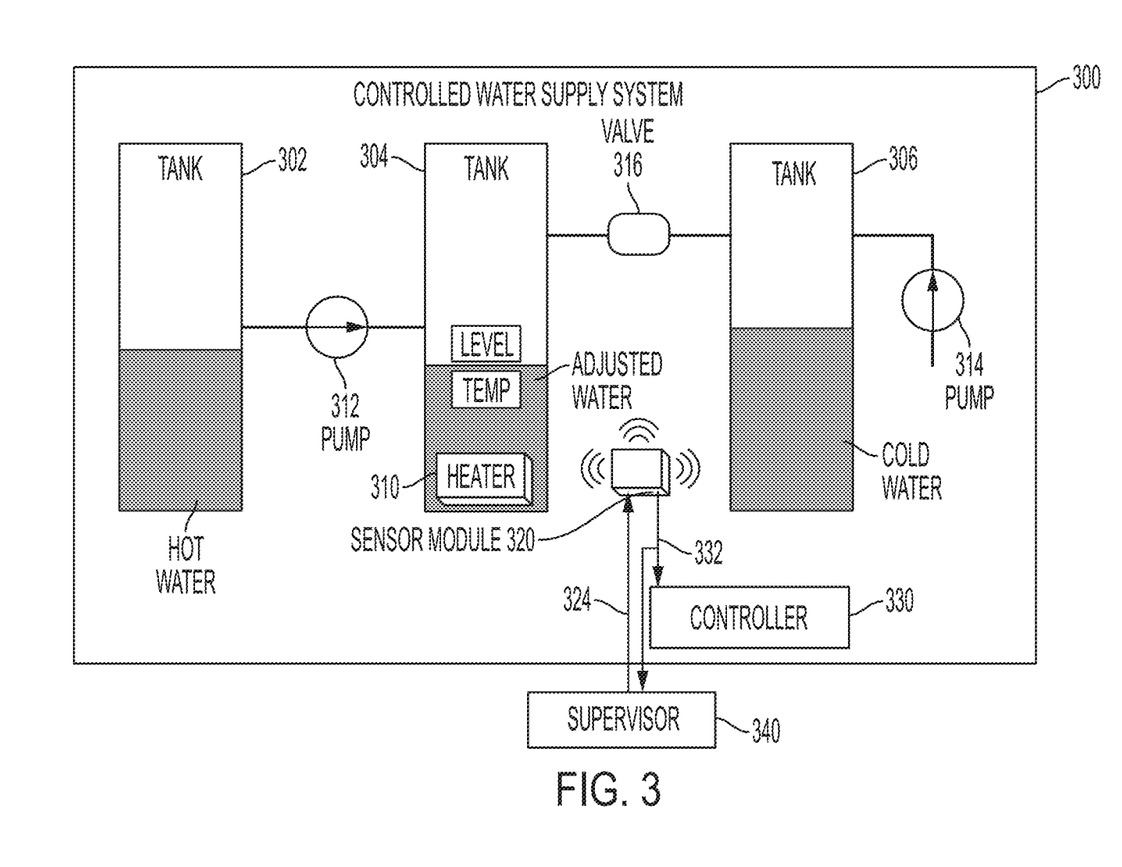
FIG. 3 illustrates an exemplary controlled water supply system, in accordance with an embodiment of the present application.

FIG. 3 illustrates an exemplary controlled water supply system, in accordance with an embodiment of the present application. In this example, a controlled water supply system 300 that can facilitate a controlled chemical process. System 300 can be controlled by a Linear Quadratic Gaussian controller 330 that supports action that regulates tracking of output with respect to r. A supervisor 340 can be embedded into system 300 for supervision so that system 300 can continue to regulate its output around r. Supervisor 340 can include a trained RL agent. Hyper-parameters of the DDPG algorithm can be set to predetermined values. The RL agent of supervisor 340 can be trained to optimize cost J with $c_t$.

System 300 can include water tanks 302, 304, and 306 for hot water, adjusted water, and cold water, respectively. Hence, the system state, $x_t$, can indicate the level of water in tanks 304 and 306, and the temperature of water in tank 304 at time t. The control inputs, $u_t$, can be respective control signals to flow pumps 312 and 314, valve 316, and heater 310 from controller 330. The objective of controller 330 is to regulate state vector around a reference value r that dictates the target level of water in tanks 304 and 306, and the target temperature of water in tank 304.

System 300 can include a sensor module 320 that can provide sensor readings 322 indicative of water levels in tanks 304 and 306, and water temperature of tank 304. Here, system 300 can be over-observed by s sensors in sensor module 320. In some embodiments, the sensors can be identical with $C_k = I_k$. The linearized representation of system 300 can satisfy $x_{t+1} = Ax_t + Bu_t + \Gamma \xi_t$ with specific values of state and input matrices. Sensors in sensor module 320 can be prone to arbitrary/random but constant faults. Supervisor 340 can perform one or more actions 324 to mitigate the faults.

Operations

Figure 4:
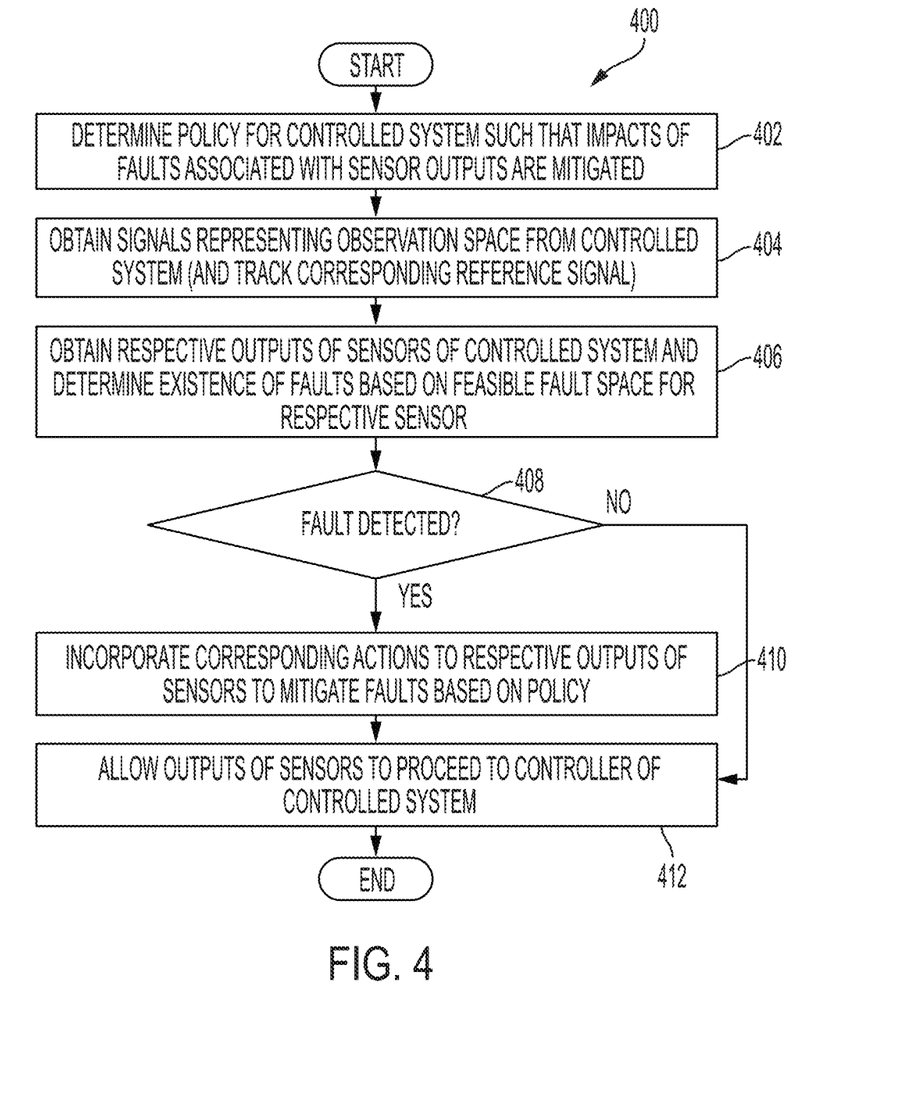
FIG. 4 presents a flowchart illustrating a method of a supervisor mitigating a fault associated with a controlled system, in accordance with an embodiment of the present application.

FIG. 4 presents a flowchart 400 illustrating a method of a supervisor mitigating a fault associated with a controlled system, in accordance with an embodiment of the present application. During operation, the supervisor can determine a policy for a controlled system such that the impacts of faults associated with the sensor outputs are mitigated (operation 402). The supervisor can then obtain signals representing the observation space from controlled system (and track the corresponding reference signal) (operation 404). The supervisor can also obtain the respective outputs of sensors of the controlled system and determine the existence of faults based on the feasible fault space for a respective sensor (operation 406).

The supervisor can then determine whether a fault is detected (operation 408). If a fault is detected, the supervisor can incorporate corresponding actions to respective outputs of the sensors to mitigate the faults based on the policy (operation 410). On the other hand, if a fault is not detected (operation 408) or upon incorporating the actions (operation 410), the supervisor can allow outputs of the sensors to proceed to the controller of the controlled system (operation 412).

Figure 5:
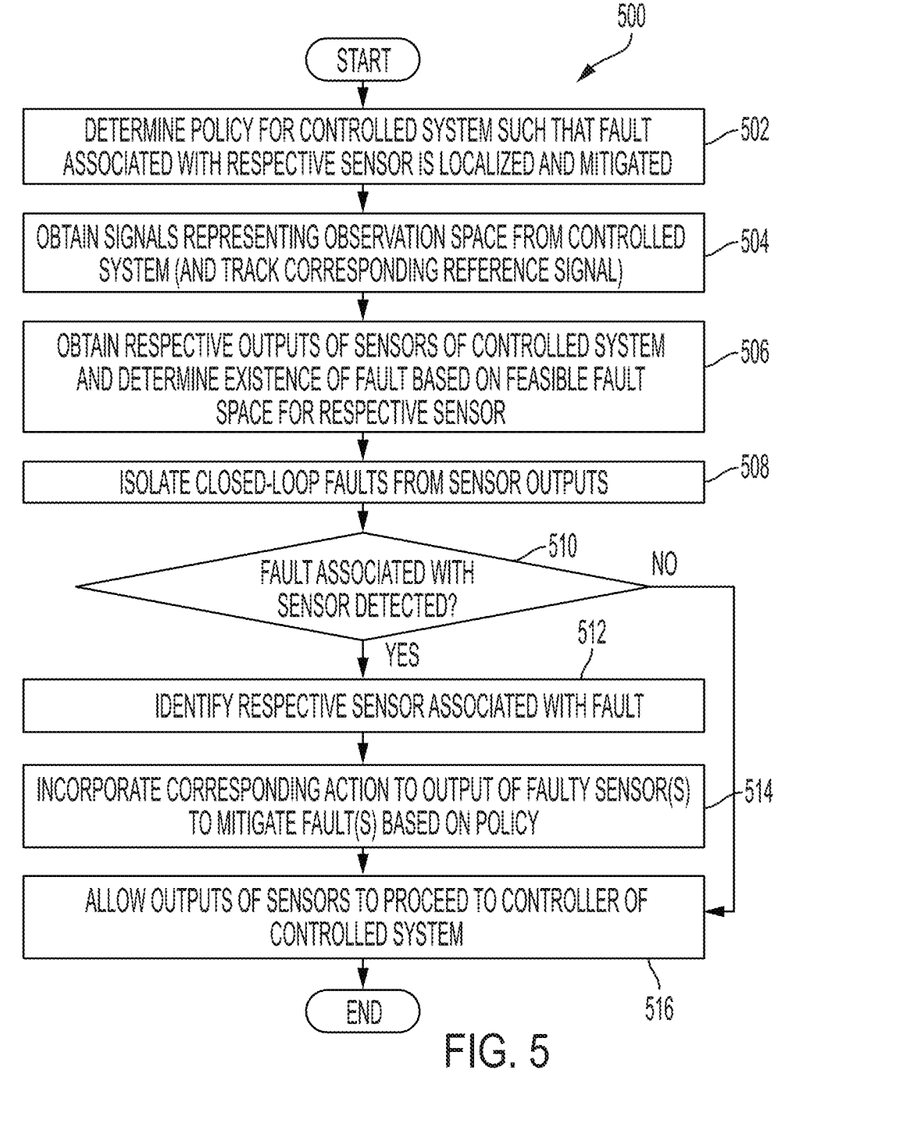
FIG. 5 presents a flowchart illustrating a method of a supervisor mitigating and localizing a fault associated with a controlled system, in accordance with an embodiment of the present application.

FIG. 5 presents a flowchart 500 illustrating a method of a supervisor mitigating and localizing a fault associated with a controlled system, in accordance with an embodiment of the present application. During operation, the supervisor can determine a policy for a controlled system such that a fault associated with a respective sensor is localized and mitigated (operation 502). The supervisor can then obtain signals representing the observation space from controlled system (and track the corresponding reference signal) (operation 504). The supervisor can also obtain the respective outputs of sensors of the controlled system and determine the existence of faults based on the feasible fault space for a respective sensor (operation 506).

The supervisor can then isolate closed-loop faults from the sensor outputs (operation 508) and determine whether a fault associated with a sensor is detected (operation 510). If a fault associated with a sensor is detected, the supervisor can identify a respective sensor associated with the fault (operation 512) and incorporate a corresponding action to the output of the faulty sensor(s) to mitigate the fault(s) based on the policy (operation 514). On the other hand, if a fault is not detected (operation 510) or upon incorporating the action (operation 514), the supervisor can allow outputs of the sensors to proceed to the controller of the controlled system (operation 516).

Exemplary Computer System and Apparatus

Figure 6:
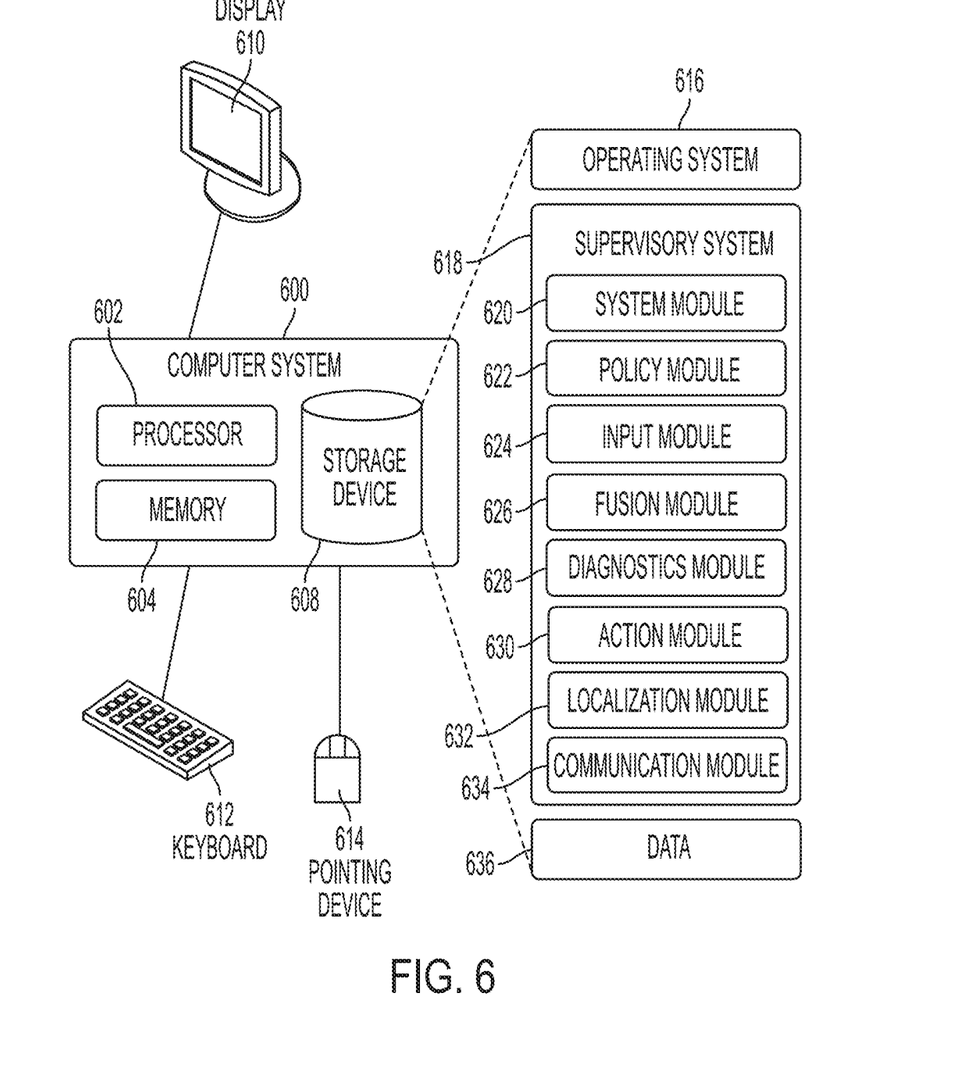
FIG. 6 illustrates an exemplary computer system that facilitates an AI-based supervisor for a controlled system, in accordance with an embodiment of the present application.

FIG. 6 illustrates an exemplary computer system that facilitates an AI-based supervisor for a controlled system, in accordance with an embodiment of the present application. Computer system 600 includes a processor 602, a memory device 604, and a storage device 608. Memory device 604 can include a volatile memory device (e.g., a dual in-line memory module (DIMM)). Furthermore, computer system 600 can be coupled to a display device 610, a keyboard 612, and a pointing device 614. Storage device 608 can store an operating system 616, a supervisory system 618, and data 636. Supervisory system 618 can facilitate the operations of parameter manager 110.

Supervisory system 618 can include instructions, which when executed by computer system 600 can cause computer system 600 to perform methods and/or processes described in this disclosure. Specifically, supervisory system 618 can include instructions for obtaining system dynamics of a controlled system (system module 620). Supervisory system 618 can also include instructions for determining a policy associated with fault mitigation and/or localization for the controlled system (policy module 622).

Furthermore, supervisory system 618 includes instructions for obtaining inputs, such as the reference signal, sensor data and adjusted state from the controlled system (input module 624). Supervisory system 618 can also include instructions for determining the sensor fusion scheme of the controlled system (fusion module 626). Moreover, supervisory system 618 can include instructions for diagnosing faults (e.g., unknown and constant faults) (diagnostics module 628). Supervisory system 618 can further include instructions for incorporating mitigating actions to the sensor data (or sensor reading) of the sensors of the controlled system (action module 630).

Supervisory system 618 can also include instructions for localizing a fault (i.e., identifying the sensor(s) associated with a fault) (learning module 632). Supervisory system 618 may further include instructions for sending and receiving messages (communication module 634). Data 636 can include any data that can facilitate the operations of one or more of supervised system 130 of FIG. 1. Data 636 may include one or more of: training data, underlying system dynamics of the controlled system, sensor data, the reference signal, and operational policy.

Figure 7:
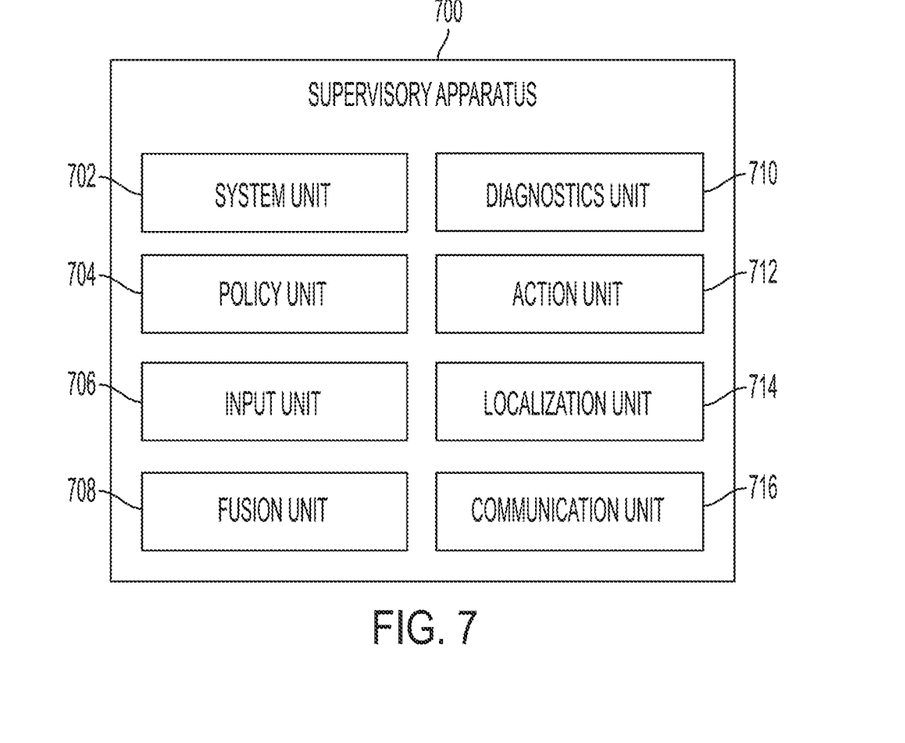
FIG. 7 illustrates an exemplary apparatus that facilitates an AI-based supervisor for a controlled system, in accordance with an embodiment of the present application.

FIG. 7 illustrates an exemplary apparatus that facilitates an AI-based supervisor for a controlled system, in accordance with an embodiment of the present application. Supervisory apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated in a computer system, or realized as a separate device that is capable of communicating with other computer systems and/or devices. Specifically, apparatus 700 can comprise units 702-716, which perform functions or operations similar to modules 620-634 of computer system 600 of FIG. 6, including: a system unit 702; a policy unit 704; an input unit 706; a fusion unit 708; a diagnostics unit 710; an action unit 712, a localization unit 714, and a communication unit 716.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only.

They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A method for fault management at a production system, the method comprising:
obtaining, by a computer system, a set of sensor readings and a state of the production system, wherein a respective sensor reading is an output of a sensor in the production system;
providing the set of sensor readings and the state of the production system to a Reinforcement Learning (RL) agent trained based on data indicating physical states of the production system;
determining, using the RL agent, whether the set of sensor readings includes at least a faulty reading produced by a corresponding faulty sensor;
determining an action that adjusts a value of the faulty reading; and
modifying the set of sensor readings based on the action, wherein the modified set of sensor readings is used as an input to a controller that controls the production system.

2. The method of claim 1, further comprising identifying the faulty sensor;
wherein adjusting the value of the faulty reading further comprises adding a value to a sensor reading of the faulty sensor.

3. The method of claim 1, wherein determining the action further comprises:
determining a reference signal for the production system, wherein the reference signal indicates a target behavior of the production system; and
determining the action such that the controller maintains the target behavior of the production system.

4. The method of claim 3, wherein the state includes an adjusted state generated by the controller for maintaining the target behavior of the production system, and wherein the adjusted state is generated based on a previously modified set of sensor readings.

5. The method of claim 1, wherein the production system comprises a plurality of sensors measuring a same element; and
wherein the method further comprises combining respective sensor readings from the plurality of sensors based on a fusion scheme.

6. The method of claim 1, wherein training of the RL agent is agnostic to system dynamics of the production system.

7. The method of claim 1, wherein the RL agent is trained to learn a policy that includes detecting a fault associated with the faulty sensor at a time of occurrence and incorporating the action.

8. The method of claim 7, wherein the policy further includes one or more of:
determining a magnitude of the fault; and
identifying the faulty sensor.

9. The method of claim 7, wherein the fault includes one or more of:
a time-varying fault that appears and disappears during operation of the production system; and
a dynamic fault that changes during operation of the production system.

10. A non-transitory computer-readable storage medium storing instructions that when executed by a computer cause the computer to perform a method for fault management at a production system, the method comprising:
obtaining a set of sensor readings and a state of the production system, wherein a respective sensor reading is an output of a sensor in the production system;
providing the set of sensor readings and the state of the production system to a Reinforcement Learning (RL) agent trained based on data indicating physical states of the production system;
determining, using the RP agent, whether the set of sensor readings includes at least a faulty reading produced by a corresponding faulty sensor;
determining an action that adjusts a value of the faulty reading; and
modifying the set of sensor readings based on the action, wherein the modified set of sensor readings is used as an input to a controller that controls the production system.

11. The non-transitory computer-readable storage medium of claim 10, wherein the method further comprises identifying the faulty sensor;
wherein adjusting the value of the faulty reading further comprises adding a value to a sensor reading of the faulty sensor.

12. The non-transitory computer-readable storage medium of claim 10, wherein determining the action further comprises:
determining a reference signal for the production system, wherein the reference signal indicates a target behavior of the production system; and
determining the action such that the controller maintains the target behavior of the production system.

13. The non-transitory computer-readable storage medium of claim 12, wherein the state includes an adjusted state generated by the controller for maintaining the target behavior of the production system, and wherein the adjusted state is generated based on a previously modified set of sensor readings.

14. The non-transitory computer-readable storage medium of claim 10, wherein the production system comprises a plurality of sensors measuring a same element; and
wherein the method further comprises combining respective sensor readings from the plurality of sensors based on a fusion scheme.

15. The non-transitory computer-readable storage medium of claim 10, wherein training of the RL agent is agnostic to system dynamics of the production system.

16. The non-transitory computer-readable storage medium of claim 10, wherein the RL agent is trained to learn a policy that includes one or more of:
detecting a fault associated with the faulty sensor at a time of occurrence;
incorporating the action;
determining a magnitude of the fault; and
identifying the faulty sensor.

17. The non-transitory computer-readable storage medium of claim 16, wherein the fault includes one or more of:
a time-varying fault that appears and disappears during operation of the production system; and
a dynamic fault that changes during operation of the production system.

18. A computer system, comprising:
a storage device;
a processor;

a non-transitory computer-readable storage medium storing instructions, which when executed by the processor causes the processor to perform a method for fault management at a production system, the method comprising:
  obtaining a set of sensor readings and a state of the production system, wherein a respective sensor reading is an output of a sensor in the production system;
  providing the set of sensor readings and the state of the production system to a Reinforcement Learning (RL) agent trained based on data indicating physical states of the production system;
  determining, using the RL agent, whether the set of sensor readings includes at least a faulty reading produced by a corresponding faulty sensor;
  determining an action that adjusts a value of the faulty reading; and
  modifying the set of sensor readings based on the action, wherein the modified set of sensor readings is used as an input to a controller that controls the production system.

19. The computer system of claim 18, wherein the method further comprises identifying the faulty sensor;
  wherein adjusting the value of the faulty reading further comprises adding a value to a sensor reading of the faulty sensor.

20. The computer system of claim 18, wherein a fault associated with the faulty sensor includes one or more of:
  a time-varying fault that appears and disappears during operation of the production system; and
  a dynamic fault that changes during operation of the production system.

\* \* \* \* \*